Sept. 1, 1970 SEIJI IKEGAMI ET AL 3,526,597

PIEZOELECTRIC CERAMIC COMPOSITIONS

Filed Nov. 27, 1967

SEIJI IKEGAMI AND
ICHIRO UEDA, INVENTORS

By Wenderoth Lind & Ponack,
Attys

United States Patent Office 3,526,597

Patented Sept. 1, 1970

3,526,597

PIEZOELECTRIC CERAMIC COMPOSITIONS

Seiji Ikegami, Osaka-shi, Osaka-fu, and Ichiro Ueda, Nishinomiya-shi, Japan, assignors to Matsushita Electric Industrial Co., Ltd., Kadoma, Osaka, Japan Filed Nov. 27, 1967, Ser. No. 685,773

Claims priority, application Japan, Mar. 24, 1967, 42/18,762

Int. Cl. C04b *35/00*

U.S. Cl. 252—62.9 5 Claims

ABSTRACT OF THE DISCLOSURE

Piezoelectric ceramic compositions for use in high temperature applications and high frequency operations and having a high stability with time consist essentially of lead titanate and at least one of the following:

$ZnO$, $PbO$, $Bi_2O_3$, $La_2O_3$, $Ce_2O_3$, $Sm_2O_3$, $Gd_2O_3$, $TiO_2$, $Nb_2O_5$ and $Ta_2O_5$ the quantity of the latter ranging from about 0.05 to about 10.00 mole percent. A ceramic body of such composition is poled to produce a high coupling factor by subjecting the ceramic body to a polarizing voltage of 30 to 60 kv./cm. at a temperature of 150 to 250° C.

This invention relates to piezoelectric ceramic compositions for use in high temperature applications and high frequency operations and having a high stability with time.

EXPLANATION OF PRIOR ART

Ferroelectric ceramics such as barium titanate $(BaTiO_3)$ lead titanate-lead zirconate solid solution ($PbTiZrO_3$) and lead metaniobate ($PbNb_2O_6$) poled under a direct current field have been used widely as piezoelectric transducers such as vibration pick-ups, accelerometers, igniters and wave filters.

Recent space electronics strongly require piezoelectric ceramic materials having a high operating temperature and a temperature-independent electromechanical coupling factor, because the mechanical vibration of e.g. a rocket surface and the acceleration of a rocket have to be measured without correction for temperature.

$BaTiO_3$ and $PbTiZrO_3$ have Curie points of 120° C. and of 350° C. (at highest), respectively. Electromechanical coupling factors of these two materials decrease rather rapidly as the temperature approaches their Curie points. $PbNb_2O_6$ has a Curie point of 570° C., but is restricted in the maximum operating temperature to about 300° C. due to electrical conductivity. Under these circumstances, conventional piezoelectric ceramics are operable only below 350° C.

The other two requirements for piezoelectric ceramics are a high stability with time and a low value of dielectric constant. Conventional piezoelectric ceramics change in physical properties with time. This phenomenon is called "aging" and is an obstacle for practical use. For example, a ceramic wave filter changes in mechanical resonance frequency as well as pass band with time. This is a drawback of ceramic wave filters.

Recent electronics industry is requiring wave filters applicable for higher frequency. Since a wave filter for use in a high frequency utilizes a thickness extensional or thickness shear mode of vibration, the distance between the wave filter electrodes is inversely proportional to the frequency. Thus, the impedance of a wave filter is proportional to $1/\omega^2\epsilon$ for constant area of electrode, wherein $\omega$ is angular frequency and $\epsilon$ is the dielectric constant of the ceramic material. A wave filter is usually connected with a transistor having at least about 100 ohms of input impedance. From a viewpoint of impedance matching, the impedance of a wave filter should be more than 100 ohms. Therefore, the highest operating frequency of a wave filter is inversely proportional to the root of the dielectric constant. Thus, it is necessary for a high frequency application of wave filter that a piezoelectric ceramic has both a high stability of frequency constant and a low value of dielectric constant.

Lead titanate ($PbTiO_3$) is known to have a high Curie point (490° C.) but has not been used as a piezoelectric ceramic, because of its poor sinterability and because of difficulty in poling. Therefore, it is desirable to improve the lead titanate compositions in sinterability and poling characteristics.

OBJECT

An object of this invention is to provide ceramic compositions suitable for use as stable electromechanical transducers up to about 500° C.

Other objects are to provide piezoelectric ceramic compositions with a stable frequency constant and a low dielectric constant.

DRAWING

DETAILS

Figure 1:
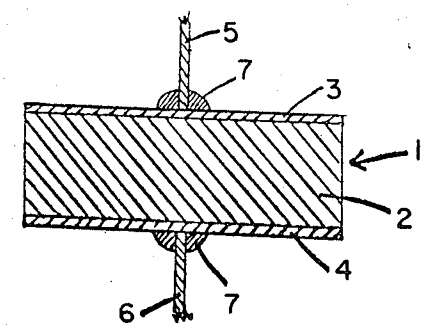
FIG. 1 is a cross-sectional view of an electromechanical transducer which is constructed from ceramic according to this invention.

Before proceeding with a detailed description of the novel ceramic compositions contemplated by the present invention, the construction of electromechanical transducers comprising piezoelectric ceramic materials according to this invention will be explained with reference to FIG. 1, wherein reference character 1 designates, as a whole, an electromechanical transducer having, as its active element, a preferably disc shaped body 2 of piezoelectrical ceramic material according to the present invention.

Body 2 is provided with a pair of electrodes 3 and 4 applied in a suitable and per se conventional manner on the two opposite surfaces thereof. Wire leads 5 and 6 are attached conductively to the electrodes 3 and 4, repectively, by means of solder 7. The body 2 is poled electrostatically through the lead wires 5 and 6. When the transducer is used as a vibration pick-up, accelerometer or igniter, electrical output generated can be taken from wire leads 5 and 6. Conversely, when it is used as a wave filter, electrical voltage can be applied through lead wires 5 and 6.

It has been discovered according to the present invention that piezoelectric ceramics comprising $PbTiO_3$ and at least one additive element selected from the group consisting of zinc oxide ($ZnO$), lead oxide ($PbO$), bismuth trioxide ($Bi_2O_3$) lanthanum trioxide ($La_2O_3$), cerium trioxide ($Ce_2O_3$), samarium trioxide ($Sm_2O_3$), gadolinium trioxide ($Gd_2O_3$), titanium dioxide ($TiO_2$), niobium pentoxide ($Nb_2O_5$) and tantalum pentoxide ($Ta_2O_5$), have a good sinterability to produce a sintered body having a mechanical strength sufficient for use in piezoelectric ceramic transducer elements and are provided with a coupling factor which is stable up to about 500° C. So-produced piezoelectric ceramics according to the invention have a high stability of frequency constant with time and a low dielectric constant suitable for use in a high frequency range.

Operable total amount of said additive elements is 0.05 to 10.00 mole percent in accordance with this invention. The $PbTiO_3$ ceramics having a total amount of said additive elements in an amount less than 0.05 mole percent are too fragile to be used as a piezoelectric transducer element. When said additive elements have added thereto a mole percent greater than 10.00 mole percent in total, the resultant ceramics do not exist crystallographically in a single phase and have a dielectric breakdown field which is too low to give a sufficient piezoelectric activity.

It has been discovered according to the present invention that the following combined additions listed in Table 1 produce superior transducer elements:

TABLE 1

(1)—PbO (2.0 to 5.0 mole percent) and $Nb_2O_5$ (0.5 to 2.0 mole percent)
(2)—ZnO (0.5 to 2.0 mole percent), PbO (2.0 to 5.0 mole percent) and $Nb_2O_5$ (0.5 to 2.0 mole percent)
(3)—ZnO (1.0 to 2.5 mole percent), $Bi_2O_3$ (1.0 to 2.5 mole percent) and $TiO_2$ (1.0 to 2.5 mole percent)
(4)—ZnO (0.5 to 2.0 mole percent), $Bi_2O_3$ (0.5 to 2.0 mole percent) and $Nb_2O_5$ (0.5 to 2.0 mole percent)

The starting materials are chemically pure ZnO, PbO, $Bi_2O_3$, $La_2O_3$, $Ce_2O_3$, $Sm_2O_3$, $Gd_2O_3$, $TiO_2$, $Nb_2O_5$ and $Ta_2O_5$. Any other forms such as carbonates and hydroxides which may be converted into oxide can be used as starting materials. The compositions according to the invention can be fabricated to a sintered body in a per se well known ceramic technique. Mixtures in a given composition are, for example, mixed well with alcohol in a mortar, dried under infrared, pressed loosely into a pellet and calcined at 700 to 900° C. for 2 hours. The calcined pellet is then ground thoroughly and pressed at about 1000 kilograms per square centimeter into the form of discs in accordance with the prior ceramic technique. These discs are heated at 1100 to 1300° C. for 1 hour in air, and furnace-cooled.

TABLE 2

| Sample No. | $PbTiO_2$ (mole percent) | Additive(s) (mole percent) |
|---|---|---|
| 1 | 99.95 | $Bi_2O_3$ (0.05). |
| 2 | 99.00 | $Bi_2O_3$ (1.00). |
| 3 | 95.00 | $Bi_2O_3$ (5.00). |
| 4 | 96.69 | $Bi_2O_3$ (0.83), $TiO_2$ (2.48). |
| 5 | 93.44 | $Bi_2O_3$ (1.64), $TiO_2$ (4.92). |
| 6 | 96.53 | PbO (2.48), $Nb_2O_5$ (0.99). |
| 7 | 93.14 | PbO (4.90), $Nb_2O_5$ (1.96). |
| 8 | 95.90 | ZnO (0.82), PbO (2.46), $Nb_2O_5$ (0.82). |
| 9 | 91.94 | ZnO (1.61), PnO (4.84), $Nb_2O_5$ (1.61). |
| 10 | 96.31 | ZnO (1.23), $Bi_2O_3$ (1.23), $TiO_2$ (1.23). |
| 11 | 92.68 | ZnO (2.44,) $Bi_2O_3$ (2.44), $TiO_2$ (2.44). |
| 12 | 97.51 | ZnO (0.83), $Bi_2O_3$ (0.83), $Nb_2O_5$ (0.83). |
| 13 | 94.99 | ZnO (1.67), $Bi_2O_3$ (1.67), $Nb_2O_5$ (1.67). |

Table 2 shows mole percent of $PbTiO_3$, and mole percent of various additive elements, of illustrative compositions according to the invention. Ceramic compositions according to Table 2 are fabricated into sintered discs in a way similar to that mentioned above. The sintered discs are electroded by applying a silver paint to the opposite surfaces, as shown in FIG. 1, similarly to the prior art.

It has been discovered according to the present invention that a sintered body comprising compositions according to the invention can be provided with a high coupling factor by poling the sintered body immersed in an insulating oil such as methylphenylsilicone oil (available commercially as Dow Corning 550 Fluid and polytetrafluoroethylene oil (available commercially as Du Pont Teflon oil or ICI Fluon oil) under polarizing voltage of 30 to 60 kv./cm. at 150 to 250° C., and cooling to room temperature of about 20° to 30° C. without or with applying said polarizing voltage. A piezoelectric ceramic constructed in such a way, can be used as an electromechanical transducer of a vibration pickup, accelerometer, igniter or wave filter.

Dielectric and piezoelectric constants are measured in accordance with the per se well known method described, for example, in IRE Stnadard on Piezoelectric Crystals: Measurement of Piezoelectric Ceramics, 1961. The stability of a frequency constant is represented by the aging rate of frequency constant (percent time decade) which is defined in the IRE Standard.

TABLE 3

| Sample No. | Aging rate of frequency constant (percent/time decade) | Dielectric constant | Curie point (° C.) | $g_{33}$ ($10^{-3}$ Vm/N) |
|---|---|---|---|---|
| 1 | 0.05 | 196 | 494 | 12 |
| 2 | 0.09 | 208 | 494 | 10 |
| 3 | 0.1 | 253 | 571 | 10 |
| 4 | 0.08 | 196 | 497 | 4.1 |
| 5 | 0.08 | 247 | 503 | 6.6 |
| 6 | 0.09 | 247 | 481 | 4.0 |
| 7 | 0.1 | 261 | 466 | 16 |
| 8 | 0.01 | 204 | 491 | 11 |
| 9 | 0.008 | 235 | 482 | 23 |
| 10 | 0.08 | 167 | 511 | 23 |
| 11 | 0.1 | 172 | 524 | 28 |
| 12 | 0.05 | 200 | 495 | 7.9 |
| 13 | 0.05 | 200 | 470 | 29 |

Table 3, in which the sample numbers correspond to those of Table 2, shows aging rate of frequency constant, dielectric constant at room temperature, Curie point and piezoelectric voltage constant $g_{33}$ of each ceramic composition. It will be clear from Table 3 that the piezoelectric ceramics, as embodiments of the present invention, have a high stability of frequency constant and dielectric constants ranging from 167 to 261.

It should be noted that samples 9, 10, 11 and 13 have a piezoelectric voltage constant $g_{33}$ more than $20\times10^{-3}$ Vm/N and thus have a high potential for use in vibration pick-up, accelerometer and igniter.

Such high stability of frequency constant, low dielectric constant and high value of $g_{33}$ can be obtained in accordance with the invention, when $Bi_2O_3$ is replaced with $La_2O_3$, $Ce_2O_3$, $Sm_2O_3$ or $Gd_2O$, and/or $Nb_2O_5$ is replaced with $Ta_2O_5$.

Figure 2:
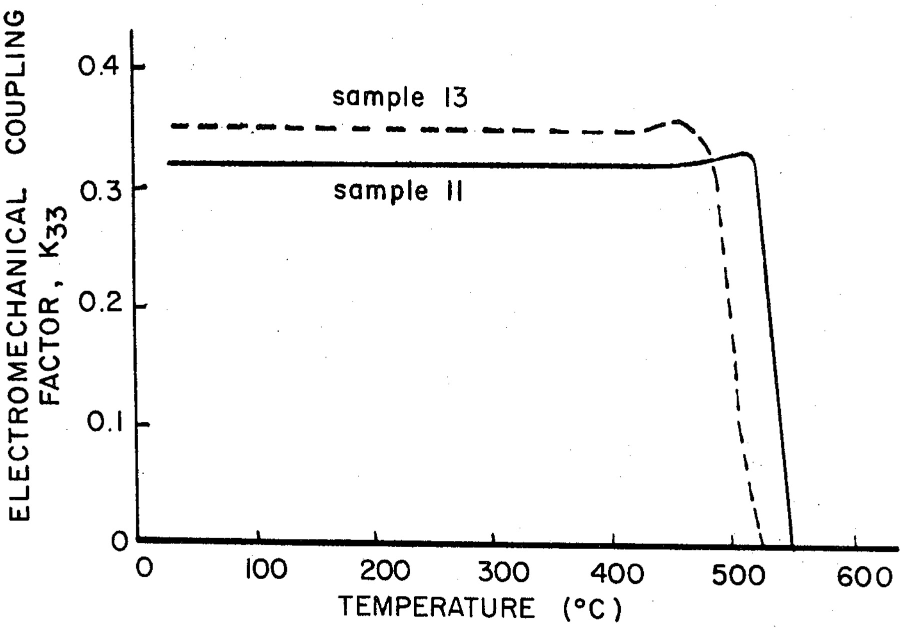
FIG. 2 is a graph showing temperature dependence of electromechanical coupling factor of two ceramics according to the invention.

The novel piezoelectric ceramics according to the present invention are provided with electromechanical coupling factors which are very stable with temperature. Referring to FIG. 2 which shows typical examples of a stable electromechanical coupling factor $k_{33}$ according to the invention, the coupling factors $k_{33}$ of samples 11 and 13 indicated in Tables 2 and 3 are almost constant with temperature up to about 520° C. and 470° C., respectively, which correspond to the Curie points thereof. Therefore, it will be readily understood that the piezoelectric ceramics according to the present invention can be used as stable piezoelectric transducer elements for use in high temperature applications such as a vibration pick-up and an accelerometer for a rocket.

We claim:

1. A piezoelectric ceramic composition consisting essentially of $PbTiO_3$ and an additive selected from the group consisting of:
(a) 0.05 to 10.00 mole percent of ZnO,
(b) 0.05 to 10.00 mole percent of $La_2O_3$,
(c) 0.05 to 10.00 mole percent of $Ce_2O_3$,
(d) 0.05 to 10.00 mole percent of $Sm_2O_3$,
(e) 0.05 to 10.00 mole percent of $Gd_2O_3$,
(f) 0.05 to 10.00 mole percent of $Nb_2O_5$,
(g) 0.05 to 10.00 mole percent of $Ta_2O_5$,
(h) a combination of 0.83 to 1.64 mole percent of $Bi_2O_3$ and 2.48 to 4.92 mole percent of $TiO_2$,
(i) a combination of 0.5 to 2.0 mole percent of ZnO, 2.0 to 5.0 mole percent of PbO and 0.5 to 2.0 mole percent of $Nb_2O_5$,
(j) a combination of 1.0 to 2.5 mole percent of ZnO, 1.0 to 2.5 mole percent of $Bi_2O_3$ and 1.0 to 2.5 mole percent of $TiO_2$, and
(k) a combination of 0.5 to 2.0 mole percent of ZnO, 0.5 to 2.0 mole percent of $Bi_2O_3$ and 0.5 to 2.0 mole percent of $Nb_2O_5$.

2. A method of poling a piezoelectric ceramic body to produce a high coupling factor, which comprises providing a piezoelectric ceramic body consisting essentially of $PbTiO_3$ and an additive selected from the group consisting of:

(a) 0.05 to 10.00 mole percent of ZnO,
(b) 0.05 to 10.00 mole percent of $La_2O_3$,
(c) 0.05 to 10.00 mole percent of $Ce_2O_3$,
(d) 0.05 to 10.00 mole percent of $Sm_2O_3$,
(e) 0.05 to 10.00 mole percent of $Gd_2O_3$,
(f) 0.05 to 10.00 mole percent of $Nb_2O_5$,
(g) 0.05 to 10.00 mole percent of $Ta_2O_5$,
(h) a combination of 0.83 to 1.64 mole percent of $Bi_2O_3$ and 2.48 to 4.92 mole percent of $TiO_2$,
(i) a combination of 0.5 to 2.0 mole percent of ZnO, 2.0 to 5.0 mole percent of PbO and 0.5 to 2.0 mole percent of $Nb_2O_5$,
(j) a combination of 1.0 to 2.5 mole percent of ZnO, 1.0 to 2.5 mole percent of $Bi_2O_3$ and 1.0 to 2.5 mole percent of $TiO_2$, and
(k) a combination of 0.5 to 2.0 mole percent of ZnO, 0.5 to 2.0 mole percent of $Bi_2O_3$ and 0.5 to 2.0 mole percent of $Nb_2O_5$;

and subjecting said piezoelectric ceramic body to a polarizing voltage of 30 to 60 kv./cm. at a temperature of 150° to 250° C.

3. A piezoelectric ceramic composition according to claim 1 wherein said additive is a combination of 0.5 to 2.0 mole percent of ZnO, 2.0 to 5.0 mole percent of PbO and 0.5 to 2.0 mole percent of $Nb_2O_5$.

4. A piezoelectric ceramic composition according to claim 1 wherein said additive is a combination consisting essentially of 1.0 to 2.5 mole percent of ZnO, 1.0 to 2.5 mole percent of $Bi_2O_3$ and 1.0 to 2.5 mole percent of $TiO_2$.

5. A piezoelectric ceramic composition according to claim 1 wherein said additive is a combination consisting essentially of 0.5 to 2.0 mole percent of ZnO, 0.5 to 2.0 mole percent of $Bi_2O_3$ and 0.5 to 2.0 mole percent of $Nb_2O_5$.

References Cited

UNITED STATES PATENTS 2,805,165 9/1957 Goodman ---------- 106—39

OTHER REFERENCES

Friebergs: "Chemical Abstracts," vol. 56, p. 8128c (1962).

Jansons et al.: "Chemical Abstracts," vol. 67, p. 77208q (1967).

Matsuo et al.: "Japanese Journal of Applied Physics," vol. 3, pp. 799–801 (1964).

Subbarao: "Journal of the American Ceramic Society," vol. 43, No. 3, pp. 119–122 (1960).

Tien et al.: "Journal of the American Ceramic Society," vol. 45, No. 12, pp. 567–571 (1962).

TOBIAS E. LEVOW, Primary Examiner

J. COOPER, Assistant Examiner

U.S. Cl. X.R.

106—39